(12) United States Patent
Wilson et al.

(10) Patent No.: US 7,697,925 B1
(45) Date of Patent: Apr. 13, 2010

(54) SYNCHRONIZED LIGHT SHOWS ON CELLULAR HANDSETS OF USERS AT A GATHERING

(75) Inventors: Thomas H. Wilson, Overland Park, KS (US); Mark Loyd Jones, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 565 days.

(21) Appl. No.: 11/656,724

(22) Filed: Jan. 23, 2007

(51) Int. Cl.
*H04M 3/00* (2006.01)

(52) U.S. Cl. ............... 455/418; 455/502; 455/575.1; 455/90.3

(58) Field of Classification Search .......... 455/414.2, 455/418, 419, 456.1–456.3, 566, 567, 575.1
See application file for complete search history.

(56) References Cited

U.S. PATENT DOCUMENTS

| | | | |
|---|---|---|---|
| 7,161,496 B2 * | 1/2007 | Bocking et al. | 340/815.45 |
| 7,373,120 B2 * | 5/2008 | Messel et al. | 455/157.2 |
| 7,546,144 B2 * | 6/2009 | de Leon et al. | 455/557 |
| 2003/0045301 A1 | 3/2003 | Wollrab | |
| 2004/0203490 A1 | 10/2004 | Kaplan | |
| 2005/0122293 A1 * | 6/2005 | Wang | 345/84 |
| 2006/0038498 A1 * | 2/2006 | Maurer et al. | 315/123 |
| 2009/0105856 A1 * | 4/2009 | Kurt et al. | 700/90 |

FOREIGN PATENT DOCUMENTS

GB    2371720    7/2002

* cited by examiner

*Primary Examiner*—Temica M Beamer

(57) ABSTRACT

Light shows are produced by a plurality of individuals at a gathering using a plurality of personal wireless cellular devices wherein each device is carried by a respective individual and wherein each device has a programmable digital processor and a controllable light show illumination source. A light show application program resides on each personal wireless cellular device for providing coordinated control of the light show illumination sources. An event server stores at least one event sequence corresponding to a predetermined gathering and including at least one timed action. The event sequence is downloadable by the plurality of personal wireless cellular devices for activation of the controllable light show illumination sources in accordance with the event sequence. The system further includes a synchronizer in each device for initiating the timed action. The synchronizer may be a clock or a proximity detector (such as a Bluetooth connection with nearby users).

25 Claims, 4 Drawing Sheets

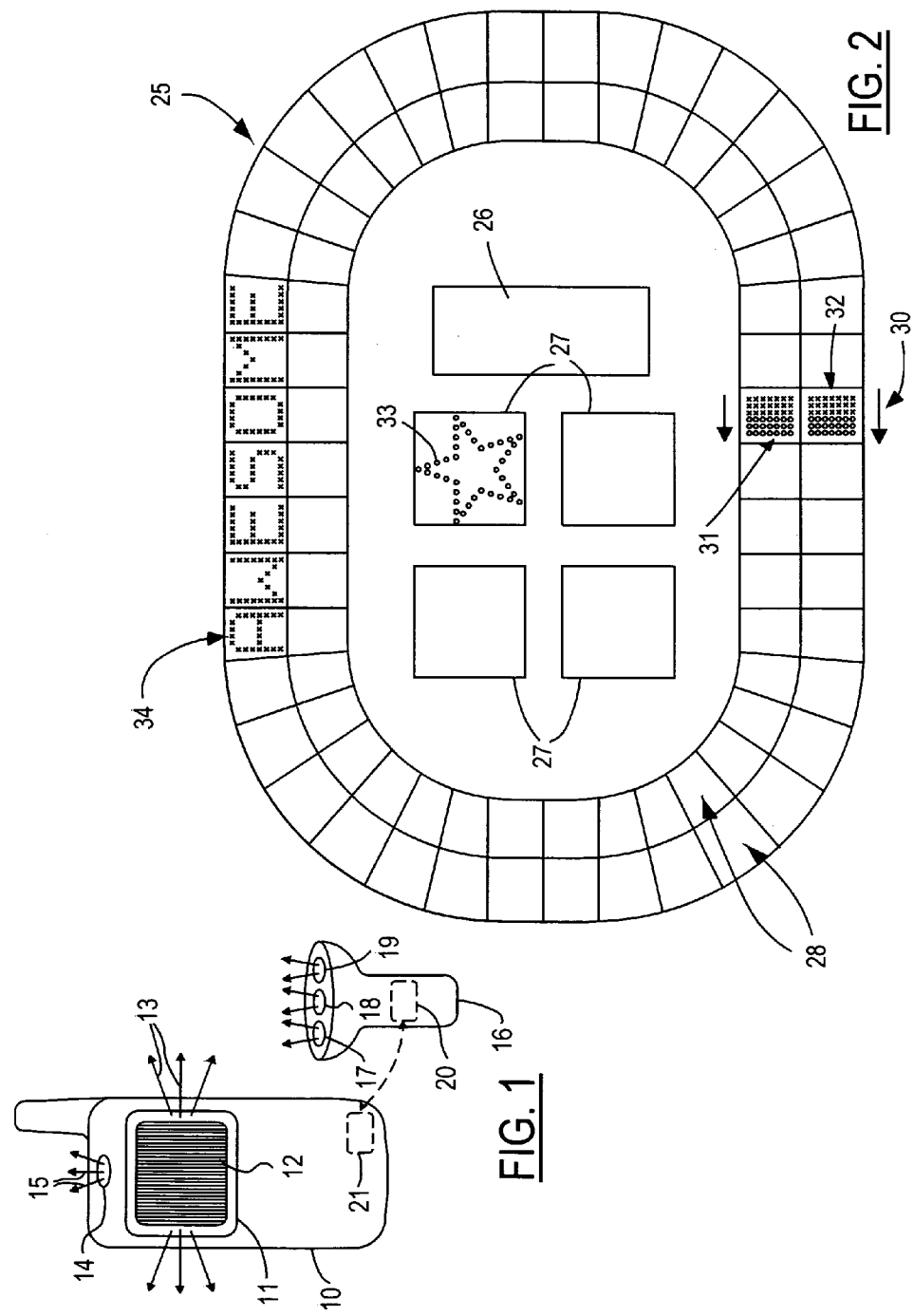

SYNCHRONIZED LIGHT SHOWS ON CELLULAR HANDSETS OF USERS AT A GATHERING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to coordinated use of wireless cellular handset displays, and, more specifically, to a wireless data network system for creating light shows at gatherings of users of wireless devices.

Portable wireless devices such as cell phones have greatly enhanced their users' ability to interact with each other in numerous ways. They have also given users remote access to digital data networks for both sending and receiving digital information using their handsets. As a result of all the technological capabilities that have been introduced, the devices have become an integral part of many aspects of people's lives such as conducting business, socializing, and entertainment.

It would be desirable to enrich the social interaction and enhance the shared entertainment experience at gatherings of users, such as at community events. Lighting displays have long been a part of group entertainment, with certain colors being associated with seasonal occasions, sports teams, or other particulars of a gathering. Colors are a powerful communications medium that can stimulate certain feelings or can communicate meaningful information to the participants. Light shows presented as part of these types of community events are most often done with fixed lighting sources in a venue under control of the venue or entertainment artists without any involvement of the audience, which passively observes the light show. Audience members may sometimes bring a light source (e.g., a flashlight, candle, or cigarette lighter) to use at an event, but any such use is essentially uncoordinated with other audience members.

Some of the most satisfying entertainment or educational events often include audience participation. Despite the great entertainment value that would result from audience participation in light show displays, there has been no effective way to synchronize and control lighting sources held by individuals.

SUMMARY OF THE INVENTION

The present invention overcomes the problems of the prior art by providing an effective manner to synchronize illumination sources held by individuals at a gathering. The light show displays of individual users can be coordinated according to their locations in the venue, locations near other particular users, and inclusion of users in particular groups of users, for example. The invention increases the capability of the cellular phone to foster social interaction through audience participation In one aspect of the invention, a light show system is provided for use by a plurality of individuals at a gathering. The system includes a plurality of personal wireless cellular devices wherein each device is carried by a respective individual and wherein each device has a programmable digital processor and a controllable light show illumination source. A light show application program resides on each personal wireless cellular device for providing coordinated control of the light show illumination sources. An event server stores at least one event sequence corresponding to a predetermined gathering and including at least one timed action. The event sequence is downloadable by the plurality of personal wireless cellular devices for activation of the controllable light show illumination sources in accordance with the event sequence. The system further includes a synchronizer in each device for initiating the timed action. The synchronizer may be a clock or a proximity detector (such as a Bluetooth connection with nearby users).

BRIEF DESCRIPTION OF THE DRAWINGS

FIG. 1 illustrates a wireless handset as a light show illumination source and an optional supplemental illumination source that interacts with the handset.

FIG. 2 is an aerial view of an event venue with a light show in progress.

DETAILED DESCRIPTION OF PREFERRED EMBODIMENTS

Figure 3:
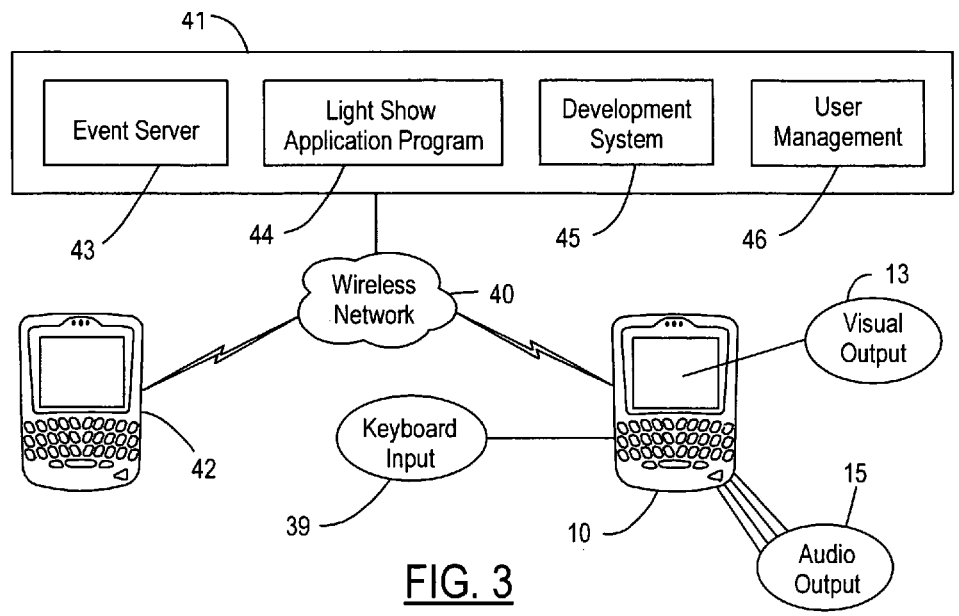
FIG. 3 is a schematic block diagram of the system of the present invention.

Operation of the invention is preferably directed by two main software components, a downloadable light show application program (i.e., applet) to run on handheld wireless devices that provides the capability to drive the rendering of certain bright, color images on the handheld device display and an event server application that serves control files for each respective light show to the users. The control files define an event sequence including timed actions for the individual handsets. Once downloaded, the light show applet can (but need not) remain on the handset to be used for later events. Light shows could be provided as a subscription service or could be billed for individual event usage. The user selects from available events to participate in through the applet, or a different applet and control file could be downloaded for each separate event.

The event server application preferably runs on a variety of computer platforms (desktop, laptop) having data network connectivity to the personal wireless devices of the users. It manages the communications to multiple handsets as well as controlling access to the various event sequences contained in the control files for respective events. The control files can define preset automated shows, manual real-time controlled, and interfaces to synchronize with externally triggered events, such as music or fireworks. For example, the event sequences may comprise a preset sequence of color images to be triggered in real-time at a precise instant by an internal clock (preferably synchronized precisely to universal coordinated time) or by an external message (such as from a message received over a local Bluetooth connection or over the wireless network). The color images or other actions of the light sources may be accompanied by an audio signal which could be downloaded as part of an event sequence or could be streamed to the handsets during a light show. Certain elements within the audio signal could also be used to trigger (i.e., synchronize) timed actions of the light show.

Referring now to FIG. 1, a personal wireless handset 10 operates as part of a cellular telecommunications network such as a PCS network. It includes a visual display 11 (such as a backlit LCD display or a TFT display) for acting as a light show illumination source to generate a light show action such as a color element 12 (shown as a solid red panel), preferably having a selectable color and a selectable intensity under control of a light show application program. Color element 12 shines outward at 13 to be seen as a part of the overall light show being coordinated by an event sequence stored in handset 10. A speaker 14 is provided in handset 10 in order to emit sound 15 in coordination with the light show.

The user may also participate in the light show using an external light display device 16 to project color elements of the light show either instead of or in addition to display 11 on handset 10. Device 16 includes a processor 20 and switching mechanisms (not shown) to control LEDs or lasers 17, 18, and 19 (each producing a respective color such as white, red, blue, or any other desired colors) in order to achieve a similar light show experience without requiring the handheld device's integrated display screen 11 to function as the light source. Controller 20 is preferably wirelessly connected to handset 10 via Bluetooth or another short-range personal area network to receive display commands from handset 10 through its Bluetooth transceiver 21.

FIG. 2 shows a gathering place or venue 25 where cellular device users have gathered for an event and where they will participate in a light show according to the present invention. Venue 25 may be arranged with a stage 26 and main floor seating sections 27. Stadium seating sections 28 are located around the periphery of venue 25. In one embodiment, venue 25 utilizes assigned seating at a particular event with each user being located in their assigned seating within seating sections 27 and 28. Based on the locations, various visual effects can be obtained during a light show. For example, a wave of colors may progress through the audience as shown at 30. Thus, a first color represented by small circles 31 cascade through the users according to radial locations within seating sections 28 followed by a second color represented by small x's 32. The double-colored wave effect seen by the audience as a whole results from a coordinated sequence wherein each individual user generates a visual display of the first color followed by the second color followed by turning off in an appropriate timed sequence.

Other effects include static images such as a star shape generated at 33 or displaying messages such as "AWESOME" spelled out based on seating locations of individual users shown at 34.

One preferred embodiment for the overall system architecture for the invention is shown in FIG. 3. A personal cellular device 10 provides a visual output 13 and audio output 15 as previously described. A keyboard input 39 may be used by the user when setting up participation in a particular light show (for selecting an event or inputting a seating location as described later). Device 10 interacts with a wireless network 40 (such as a PCS cellular network) which acts as a gateway to a digital data network 41. Other personal cellular devices such as a device 42 of another subscriber can interact with wireless network 40 or through a wireless network of a different carrier to interact with data network 41.

Digital data network 41 includes an event server 43, a server for the light show application program 44, a development system 45, and a user management control block 46. In order to participate in a light show, the user of device 10 connects to digital data network 41 to obtain a light show application program from server 44 and to receive at least one event sequence for a predetermined event from event server 43. Interaction between the user and the servers is preferably mediated by user management control block 46 to limit use of the system to authorized users. Development system 45 is utilized to create the event sequences as will be described in greater detail below. Other configurations within the data network could also be utilized. For example, the event server and the application program server could be combined.

Personal wireless devices 10 and 42 also conduct background data exchanges with wireless network 40. One such exchange preferably includes timing information to maintain synchronization of the devices' internal clocks with a network clock (thereby providing synchronization between devices that are part of the same light show).

Figure 4:
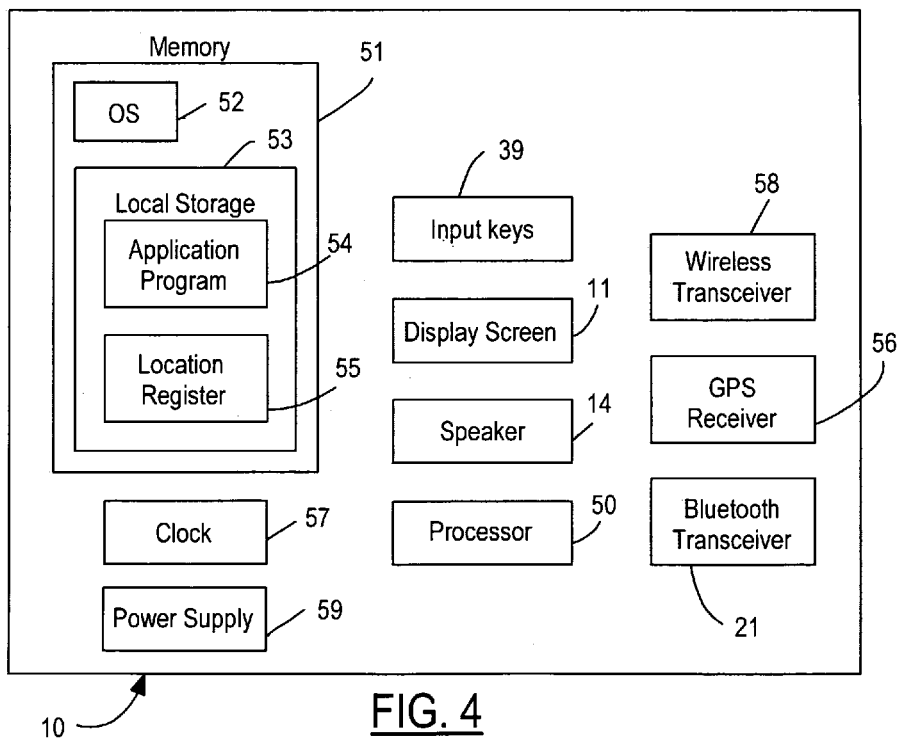
FIG. 4 is a block diagram showing a wireless handset of the invention in greater detail.

Device 10 is shown in greater detail in FIG. 4. In addition to the elements already described, device 10 utilizes a programmable processor 50 for executing the application program and other functions associated with the light show. A memory 51 stores an operating system 52 and also possesses local storage 53 which stores the application program 54 (together with a light show event sequence which is the data operated on by the application program) as well as a location register 55 which may be populated manually by the user or by a GPS receiver 56 to store the user's location in the light show as required. A clock 57 maintains a time reference (e.g., current actual time maintained as universal coordinated time) for synchronizing to a light show. A wireless transceiver 58 provides digital data connectivity over the wireless network in order to interact with the event server and other network elements of the light show system. A conventional power supply 59 (such as a rechargeable battery) is contained within device 10 for powering the electronics therein.

The present invention enables a great amount of creativity to be utilized in defining control sequences to obtain various visual effects or to convey information to participants and viewers of a light show. Example event sequences to be packaged into control files associated with particular events will be described in order to demonstrate some of the possibilities.

A portion of an example Control Sequence #1 from an overall event sequence adapted to make a wave of color that circulates around a venue with assigned seating is as follows:

| Version 1A (section 101, seats 1-5 in all rows) | | Version 1B (section 101, seats 6-10 in all rows) | |
| --- | --- | --- | --- |
| time | actions | time | actions |
| 8:00:00.00 | strobe red | 8:00:00.00 | strobe red |
| 8:00:05.00 | solid blue, play sample1.mp3 | 8:00:05.00 | solid blue, play sample1.mp3 |
| 8:00:10.00 | Off | 8:00:10.00 | off |
| 8:00:20.00 | solid white - high intensity | 8:00:20.50 | solid white - high intensity |
| 8:00:20.50 | Off | 8:00:21.00 | off |
| 8:00:24.50 | solid blue - high intensity | 8:00:24.50 | solid blue - high intensity |
| ... | ... | ... | ... |

In order to achieve a location-based effect such as a wave, different versions of the event sequence must be executed by different users located in different areas of the venue. In this instance, Version 1A would be executed by all users located in seating section 101 and seats 1-5 in all rows of the section. Versions 1B would be executed by all users located in seating section 101 and seats 6-10 in all rows of the section. At a start time of the light show, the displays for both groups of users would strobe (i.e., flash rapidly) a red color for 5 seconds and then would glow continuously blue and play an audio sample (e.g., a fanfare) for 5 seconds before turning off the displays. At a clock time of 8:00:20.00, the users in seats 1 through 5 of all rows (forming a radial spoke) would have their displays glow a solid white color at a high intensity. One-half second later at 8:00:20.50, the devices using Version 1A would turn off and the devices using Version 1B (in the next adjacent radial spoke formed by seats 6 through 10) would glow a solid white at a high intensity. Another half second later at 8:00:21.00, the devices using Version 1B would also turn off. Subsequent groups forming successive radial spokes would be activated one after another under control of additional versions (1C, 1D, 1E, . . . ) resulting in a wave of white light circulating around the seating sections. After a revolution of the wave, all the devices switch on a solid blue glow and other timed actions follow according to the design of the light show.

A portion of another example Control Sequence #2 in which a wave of color propagates from the locations of users in a predetermined subgroup is as follows:

| Version 2A (subgroup 1—leaders) | | Version 2B (subgroup 2—followers) | |
|---|---|---|---|
| time | actions | time | actions |
| 8:00:00.00 | cycle through colors | 8:00:00.00 | standby |
| 8:00:30.00 | solid green, play slow beeps | receive trigger | solid green, play fast beeps |
| 8:00:40.00 | send Bluetooth trigger signal | receive trigger | off |
| 8:01:00.00 | cycle colors and send Bluetooth trigger signal | . . . | . . . |
| . . . | . . . | . . . | . . . |

As shown in this example, synchronizing triggers for timing the actions performed by individual devices can be other than an absolute time reference for at least some of the light show participants. A first subgroup of the participants (designated as leaders) download a Version 2A of the control sequence and a second subgroup (designated as followers) download and execute a Version 2B. Actions initiated by the leader subgroup are shown as being triggered by clock times. Thus, the leader subgroup cycles through a plurality of colors at the start time while the follower subgroup remains on standby. At 8:00:30.00, the leader subgroup displays a solid green and reproduces slow beeps from the device speakers. This state indicates that a wave is about to begin. At 8:00:40.00, the leader subgroup sends Bluetooth trigger signals using their Bluetooth transceivers which are then received by any users in the follower subgroup within a close enough distance of a leader to receive the Bluetooth trigger signal (e.g., about 10 meters). A Bluetooth trigger signal may be encoded with identification codes so that only certain users in follower subgroups respond to them or they be configured so that all devices receiving it respond to it. It may be desirable to command the follower subgroup to generate a corresponding Bluetooth trigger signal in response to being triggered so that other users at a greater distance from the leader subgroup will also receive the trigger, thereby resulting in an outward propagation of the color wave.

At 8:01:00.00, the leader subgroup returns to the cycling of colors and sends a second Bluetooth trigger signal which turns off the displays in the follower subgroup when received as a trigger signal. As a result, a color wave is extinguished outwardly from the locations of members of the leader subgroup until all followers within a continuous chain of received trigger signals have extinguished their displays.

Besides Bluetooth trigger signals, the wireless network itself could be used to deliver synchronization triggers to individual devices. For example, text messages could be sent over the wireless network to identified individuals in the light show in order to orchestrate the timing of the light show from a central location, such as the event server. A limitless variety of lighting effects can be achieved using the actions and synchronization triggers described above as well as others that will be apparent to those skilled in the art.

Figure 5:
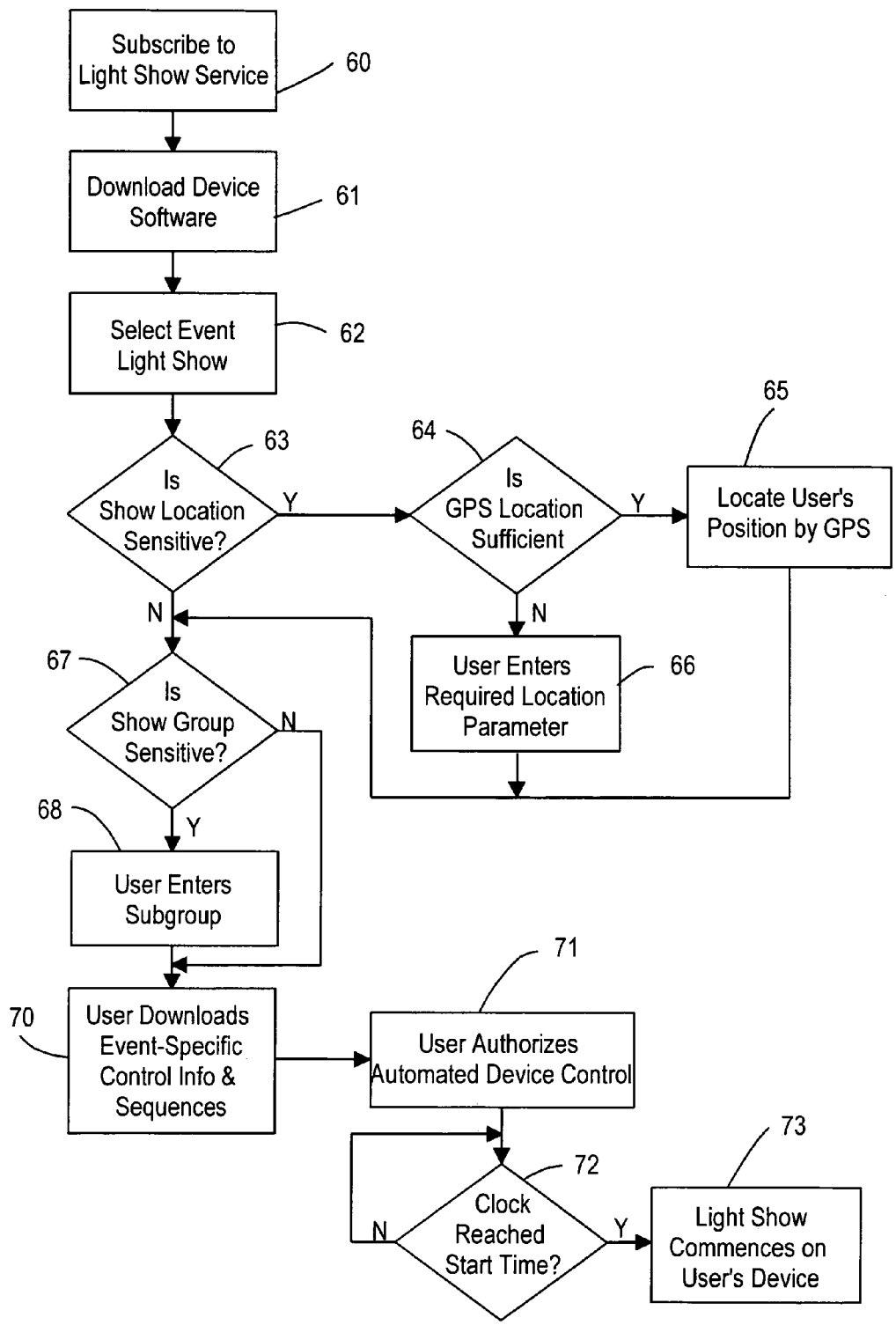
FIG. 5 is a flowchart showing a method for setting up and executing a light show on each user's wireless device.

FIG. 5 shows a preferred method of the invention wherein a wireless network customer is attending a stadium event where audience members are invited to participate in the light show using their personal wireless network devices such as data-enabled phones, wireless-enabled PDAs, or smartphones. In advance of the show time, the customer connects to the wireless data network to sign up for light show services in step 60. If not already present on the device, the user downloads the light show application program in step 61 and makes the proper selections from the available events from the event server in step 62 to select the event being attended. Authentication of the user prior to permitting downloading the application program or making a menu of light show events available to the user can be performed in conjunction with the user management block in a conventional manner.

Based on the selected event, a check is made in step 63 to determine whether the selected light show is location-sensitive (i.e., whether the light show includes event sequences that differ based on the location within the venue of the specific users). If so, then a check is made is step 64 to determine whether the location can be sufficiently determined using the GPS capability of the user. Sufficiency of a GPS location depends upon both the user being presently located in the position where they will be during the light show and availability of an accurate GPS location within the user's device (e.g., at an outdoor venue). If these are true than the user's position is located by GPS in step 65. Otherwise, the user manually enters a required location parameter in step 66, such as a seat location. In either event, the location to be used for the light show is stored in the location register associated with the user's application program.

If the show is not location-sensitive or after a location has been determined, a check is made in step 67 to determine whether the light show is group-sensitive. If so, then the user selects a subgroup in step 68. Based on the location and subgroup information, if any, the user downloads event-specific control information and sequences in step 70. In step 71, the user authorizes the automated control of the light show based on the downloaded event sequences, such as by tapping in activation key or button presented by the application program on the user interface of the device. The device then waits for the preset start time to be reached in step 72. Once the start time is reached, the light show is initiated and the preloaded visual output is shown on the display screen and audio accompaniment is output via the speaker on the user's device in step 73.

Figure 6:
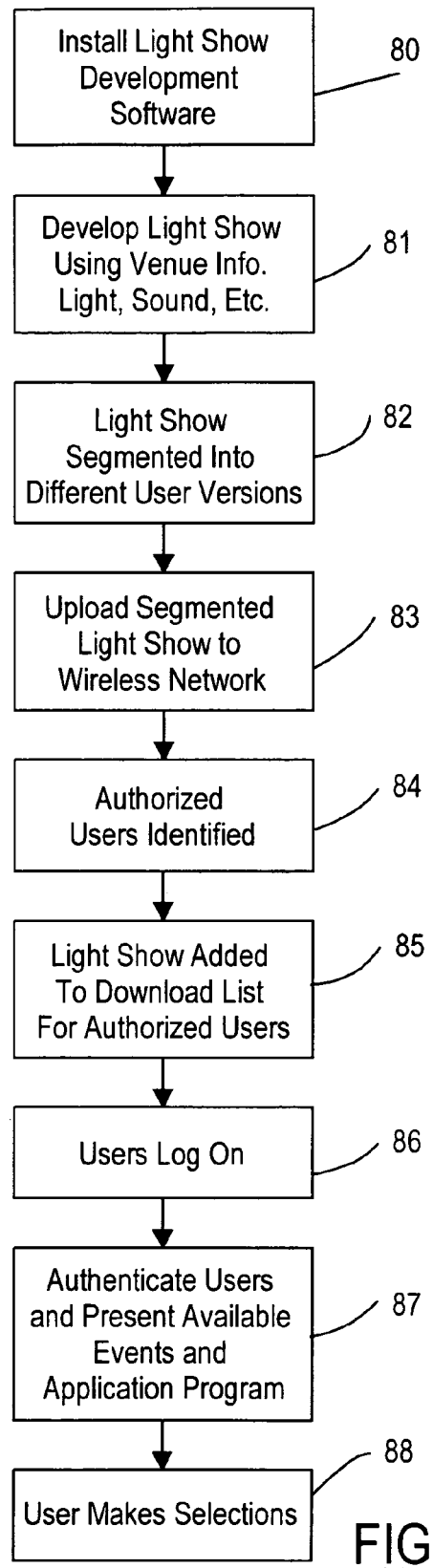
FIG. 6 is a flowchart showing a method for defining and distributing light shows for specific events with customized elements for different users within the light show.

FIG. 6 shows a preferred embodiment of providing a light show service to subscribers. A service provider may preferably operate a console/controller component in the data network. The console/controlled component may include the event server, light show application program server, development system, and user management block shown in FIG. 3 and other related components. The main functions of the provider system are to develop and distribute the light shows to their customers. The light show development function can be performed using integrated sound and graphics software that pixelizes the arena or stadium where the show will occur. Each pixel represents one or more seats or locations where different user devices might be present at the time of the show. Features can be provided in the software to create wave effects or to adapt chosen images into the light show effects where the expected participants each serve as a pixel in the image being represented. In step 81, the light show is created using venue information, expected user participation, and the desired light, sound, and timing effects that are creatively identified during the development. Based on the particular light show design, user specific event sequences are created in step 82 by segmenting the light show into different versions corresponding to individuals or groups of users and defining the specific event sequences to be performed by each individual or groups of users. The segmented light show in the form of the various versions of control sequences are uploaded to the event server accessible via the wireless network in step 83. For each light show being uploaded, authorized users are identified in step 84. Based on the identification, the light show event is added to a download list for each authorized user in step 85.

When users logon to the system in step 86, they are authenticated in step 87 and the event server presents available events and the application program if needed to the authenticated user. The authenticated user can then make a selection in step 88.

What is claimed is:

1. A light show system for use by a plurality of individuals at a gathering, comprising:
   a plurality of personal wireless cellular devices, wherein each device is carried by a respective individual, and wherein each device has a programmable digital processor and a controllable light show illumination source;
   a light show application program residing on each personal wireless cellular device for providing coordinated control of the light show illumination sources;
   an event server storing at least one event sequence corresponding to a predetermined gathering and including at least one timed action, the event sequence being downloadable by the plurality of personal wireless cellular devices for activation of the controllable light show illumination sources in accordance with the event sequence; and
   a synchronizer in each device for initiating the timed action in coordination with the other devices.

2. The system of claim 1 wherein the synchronizer comprises a clock having a time reference maintained in each respective device, and wherein the light show application program compares the time reference with a moment specified in the event sequence for the timed action.

3. The system of claim 2 wherein each cellular device is coupled to a respective wireless network and wherein the time reference is calibrated according to signals received from the respective network.

4. The system of claim 1 wherein each device further includes a location register for specifying a respective location of each respective device within the gathering, wherein the event sequence includes location-specific actions that vary between respective devices, and wherein each device performs location-specific actions corresponding to its specified location.

5. The system of claim 4 wherein at least one respective device includes a global positioning system (GPS) receiver for providing the specified location in the respective location register.

6. The system of claim 4 wherein at least one respective device includes a human interface to manually providing a respective specified location to the respective location register.

7. The system of claim 6 wherein the gathering place is a venue with assigned seating and wherein the specified location that is manually provided by a respective individual is comprised of a respective seat assignment in the venue.

8. The system of claim 4 wherein the location-specific actions generate a pixelized graphic for viewing by the individuals.

9. The system of claim 4 wherein the location-specific actions generate a light show of predetermined patterns of colors for viewing by the individuals.

10. The system of claim 9 wherein the predetermined patterns include a wave of a particular color.

11. The system of claim 1 wherein each illumination source includes a multicolor display and wherein the event sequence includes timed variations for selecting predetermined color changes on each respective device.

12. The system of claim 11 wherein the predetermined colors are generated with a predetermined intensity in response to the event sequence.

13. The system of claim 1 wherein each individual is assigned to a respective one of a plurality of subgroups, and wherein a corresponding version of the event sequence is stored on the event server and retrieved by each member of each respective subgroup so that each individual in a subgroup generates the same coordinated actions within the light show.

14. The system of claim 13 wherein each individual chooses a respective subgroup when downloading a respective version of the event sequence to their respective device.

15. The system of claim 1 wherein a plurality of the devices include a respective controllable audio source, and wherein the event sequence includes timed audio content for generating sound coordinated to the light show.

16. A method of operating a personal wireless cellular device as part of a light show, wherein the personal wireless cellular device includes a light show illumination source and is operable with a wireless network, comprising the steps of:
   retrieving an event sequence for a predetermined event from an event server over the wireless network, wherein the event sequence defines timed actions to appear on the light show illumination source, wherein the predetermined event occurs at a particular gathering place, and wherein the timed actions within the event sequence are dependent upon a location of the personal wireless cellular device within the gathering place;
   launching a light show application program residing on the personal wireless cellular device, wherein the light show application program provides coordinated control of the light show illumination source;
   detecting a current location of the personal wireless cellular device during the light show;
   selecting timed actions for display in response to the current location;
   detecting a synchronization trigger corresponding to the selected timed actions while at the predetermined event; and
   displaying the selected timed actions with the light show illumination source in response to the synchronization trigger.

17. The method of claim 16 wherein the synchronization trigger is comprised of a predefined clock time, and wherein the step of detecting a synchronization trigger is comprised of comparing a time reference maintained by the personal wireless cellular device to the predefined clock time.

18. The method of claim 16 wherein the personal wireless cellular device includes a GPS receiver, and wherein the step of detecting the current location of the personal wireless cellular device during the light show is performed using the GPS receiver.

19. The method of claim 16 wherein the predetermined event occurs at a particular venue having assigned seating, wherein the event server maintains a plurality of event sequences for the predetermined event according to assignments of the assigned seating, and wherein the step of retrieving an event sequence is comprised of:
selecting the predetermined event from a plurality of events stored on the event server;
selecting a particular assignment of the assigned seating; and
retrieving a particular one of the event sequences corresponding to the selected assignment.

20. The method of claim 16 wherein the event server stores a plurality of versions of the event sequence corresponding to a plurality of subgroups of individuals attending the predetermined event, and wherein the step of retrieving an event sequence is comprised of:
selecting one of the subgroups; and
retrieving the version corresponding to the selected subgroup so that each individual in a subgroup generates the same coordinated actions within the light show.

21. The method of claim 16 wherein the personal wireless cellular device includes a respective controllable audio source, and wherein the event sequence includes timed audio content for generating sound coordinated to the light show.

22. A method of providing a light show service for users of personal wireless cellular devices at events in respective venues, wherein the personal wireless cellular devices have respective light show illumination sources and are operable with a wireless network, the method comprising the steps of:
developing a light show based on details of the venue and visual display actions to be generated during the light show to define at least one event sequence for a predetermined event;
uploading the event sequence for the predetermined event to an event server in the wireless network, wherein the event sequence includes multiple versions if the light show includes different timed actions for different users;
determining authorizations for the users to the event sequence;
the event server receiving logon requests from the users;
authenticating the user and presenting available event sequences for the user in accordance with the determined authorizations;
receiving a selection from the user for the event sequence;
determining whether multiple versions of the event sequence have been developed for different users, and if so then determining a version corresponding to the user; and
downloading the event sequence to the personal wireless cellular device of the user.

23. The method of claim 22 wherein the multiple versions are defined according to a location within the venue that corresponds to the user, and wherein the step of determining a version of the event sequence that corresponds to the user is comprised of the user transmitting the location to the event server.

24. The method of claim 23 wherein the venue has assigned seating for participation in the event, and wherein the location is manually transmitted by the user according to a respective seating assignment.

25. The method of claim 23 wherein the personal wireless cellular device of a user includes a GPS receiver for providing the location transmitted to the event server.

* * * * *